J. DE MARTINO.
CLUTCH AND TRANSMISSION.
APPLICATION FILED JULY 21, 1919.

1,431,100.

Patented Oct. 3, 1922.

2 SHEETS—SHEET 1.

Inventor:
Joseph de Martino.

J. DE MARTINO.
CLUTCH AND TRANSMISSION.
APPLICATION FILED JULY 21, 1919.

1,431,100.

Patented Oct. 3, 1922.
2 SHEETS—SHEET 2.

Witness:
Harry S. Gaither

Inventor:
Joseph de Martino
by Dyrenforth, Lee, Chritton & Wiles Atty's

Patented Oct. 3, 1922.

1,431,100

UNITED STATES PATENT OFFICE.

JOSEPH DE MARTINO, OF CHICAGO, ILLINOIS, ASSIGNOR TO JOHN H. LEE, TRUSTEE, OF CHICAGO, ILLINOIS.

CLUTCH AND TRANSMISSION.

Application filed July 21, 1919. Serial No. 312,285.

*To all whom it may concern:*

Be it known that I, JOSEPH DE MARTINO, a citizen of the United States, residing at 812 Montrose Ave., Chicago, in the county of Cook and State of Illinois, have invented new and useful Clutches and Transmissions, of which the following is a specification.

Figure 1:
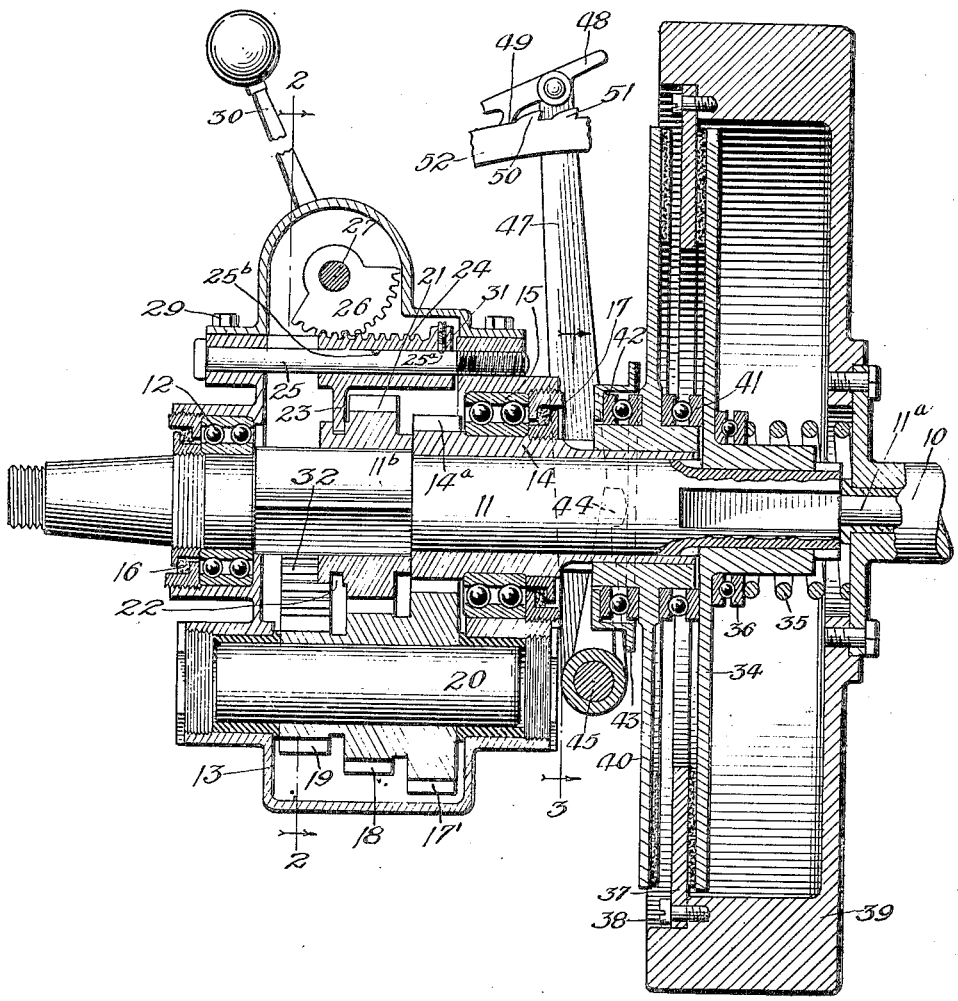

My invention relates to an automobile clutch and transmission and is fully described in the following specification and shown in the drawings in which Figure 1 is a longitudinal vertical section of my clutch and transmission.

Figure 2:
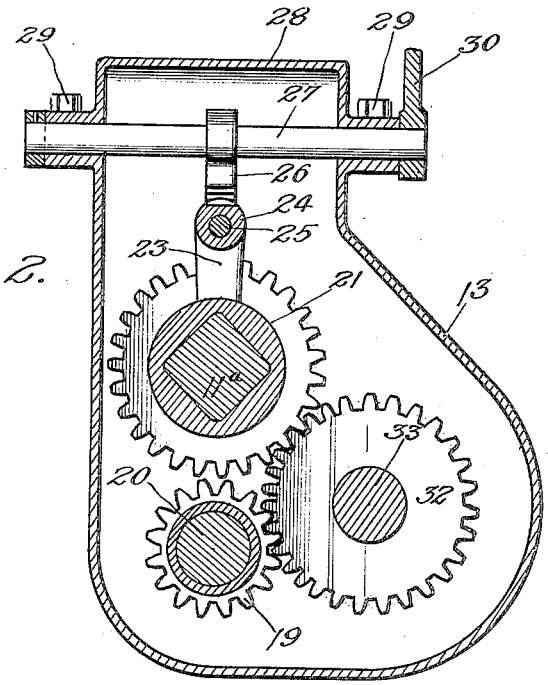
Figure 3:
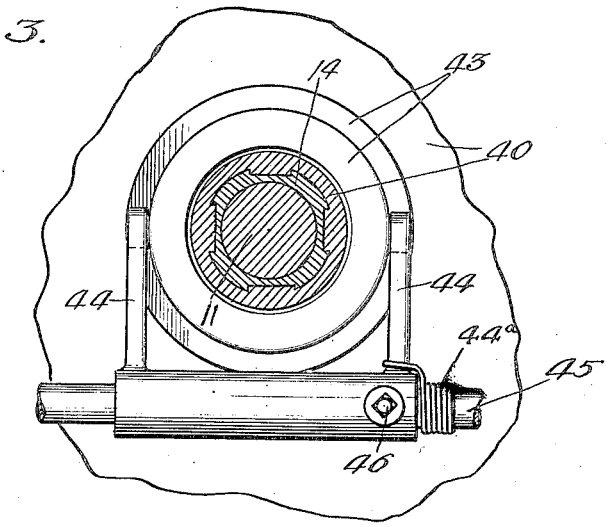

Figure 2 is a transverse section on the line 2 of Fig. 1, and Figure 3 is a partial transverse section on the line 3 of Fig. 1.

I have embodied my invention in a combined clutch and transmission for automobiles in which a driving shaft 10 is enabled to drive a driven or transmission shaft 11 at a plurality of speeds. The transmission shaft 11 preferably has an extension 11ª which is concentrically journaled in the end of the driving shaft 10. The opposite end of the transmission shaft 11 is journaled in a ball bearing 12 which is carried by the transmission housing 13.

The shaft 11 has a sleeve 14 journaled thereon which in turn is journaled in a ball bearing 15 in the housing 13. These bearings are held in place in any suitable manner such as locking nuts, whereby relative adjustment may be made and rings 16 and 17 of felt or other similar material are so placed as to retain the oil and exclude dust.

The end of the sleeve 14 within the transmission housing carries a gear 14ª which meshes with a gear 17'. This gear is preferably made integral with the concentric gears 18 and 19 and all are carried on the shaft 20 which is journaled at its ends in the housing 13. The gear 18 meshes with a gear 21 which is slidably carried on the splined section 11ᵇ of the transmission shaft 11. This gear has a circular groove 22, which is adapted to cooperate with a finger 23 for shifting the gear 21.

This finger is made integral with a rack 24 which is slidable on the rod 25 which is preferably threaded into the housing 13 as shown. A gear sector 26 meshes with this rack and is secured to a rock shaft 27 which is journaled in a cover 28 which is secured to transmission housing 13 by bolts 29. The rock shaft 27 carries a shifting lever 30. A spring pressed detent 31 is carried by the rack member 24 which is adapted to engage notches 25ª and 25ᵇ in the rod 25. These correspond to the forward and reverse driving positions respectively of the gear 21. Fig. 1 shows this gear set for driving forward. The reverse will now be explained.

The gear 19 as shown in Fig. 3, meshes with an idler gear 32 which is carried on a shaft 33 which is journaled in the housing 13. The gear 21 is adapted to mesh with either the gear 18 for forward drive at a reduced speed or with the idler gear 32 for reverse. The shifting lever 30 operating through the sector 26 and rack 24 shifts the gear 21 from one position to the other and the detent 31 tends to hold it in either operating position.

The forward end of the transmission shaft 11 is splined and slidably carries a clutch disk 34 which is pressed by a spring 35 through the medium of a ball bearing 36 so as to bring the disk into engagement with the annular disk 37. This disk is secured by means of screws 38 to the flywheel 39.

The forward end of the sleeve 14 is also splined and slidably carries a disk 40 which is adapted to engage the outer face of the disk 37. The disk 34 and the disk 40 are spaced apart by the ball bearing 41 while on the opposite side of the disk 40 the ball bearing 42 is pressed thereto by a collar 43. This collar is engaged on both sides by the bifurcated fingers 44 which are secured to the operating shaft 45 by a set screw 46 or other suitable means. A foot lever 47 is also secured to this shaft and has a pedal 48 with a dog 49 which is adapted to engage notches 50 or 51 of the quadrant 52. A spring 44ª keeps the fingers 44 pressed against the collar 43.

The operation of my clutch and transmission is as follows:

With the parts as shown in Fig. 1 the crank shaft 10 drives through the disks 37 and 34 directly through the transmission shaft 11. With the shifting lever 30 in the position shown in Fig. 1 and the foot lever 47 pressed forward somewhat, the disk 34 is released from the disk 37 and the disk 40 has not yet been brought into engagement. The result is that the shafts 10 and 11 are entirely disconnected, or as is frequently stated, the clutch is in neutral. If now it is desired to lock the clutch in this position the pedal 48 is turned so as to drive the dog 49 into engagement with the tooth 50. This will then be held in this position owing to the pressure of the spring 33. A further pressure of the foot will shift the foot lever 47 so to force the disk 40 into engagement with the disk 37. The crank shaft 10 will then drive through the disk 40 and the sleeve 14 through the gear 14ª thence through the gears 17, 18 and 21 to the transmission shaft 11. Owing to the relative sizes, however, of these gears the shaft 11 will now be driven at a much slower rate of speed than the crank shaft 10.

When it is desired to reverse, the shifting lever 30 is thrown forward thereby disconnecting the gear 21 from the gear 18 and throwing it into mesh with the idler gear 32. The crank shaft 10 will now drive through the disk 40, the sleeve 14, the gear 14ª and thence through the gear 19 and the idler gear 32 to the gear 21, which is splined on the transmission shaft 11.

Ordinarily when driving through the reverse or through the intermediate gears the foot will be held upon the pedal 48, as it is not usual to drive through these gears for any length of time. If, however, it is desired to lock the clutch in a position to drive through the intermediate gears this may be done by turning the pedal 48 so as to bring the dog 49 into engagement with the forward tooth 51.

While I have shown but a single embodiment of my invention, it is to be understood that numerous modifications are possible. Changes therefore in the construction and arrangement may be made which do not depart from the spirit and scope of my invention as disclosed in the appended claim.

What I claim as new and desire to secure by Letters Patent is:

In a device of the class described, in combination, a driving shaft, a driven shaft coaxial therewith, coacting clutch elements carried by said shafts for direct drive of said driven shaft, a sleeve on said driven shaft, a clutch element carried by said sleeve, a counter shaft, continuously meshed gears on said sleeve and counter shaft, direct and reverse gears actuated by said counter shaft, a sliding gear splined on said driven shaft coacting at will with either said direct or reverse gears, and means to control said clutches to allow said driving shaft to run free or to drive said driven shaft directly or through said direct or reverse gears.

JOSEPH de MARTINO.